(12) United States Patent
Bhatia et al.

(10) Patent No.: US 10,691,562 B2
(45) Date of Patent: Jun. 23, 2020

(54) MANAGEMENT NODE FAILOVER FOR HIGH RELIABILITY SYSTEMS

(71) Applicant: AMERICAN MEGATRENDS INTERNATIONAL, LLC, Norcross, GA (US)

(72) Inventors: Anurag Bhatia, Lilburn, GA (US); Samvinesh Christopher, Suwanee, GA (US); Winston Thangapandian, Duluth, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 71 days.

(21) Appl. No.: 15/462,002

(22) Filed: Mar. 17, 2017

(65) Prior Publication Data
US 2018/0267870 A1    Sep. 20, 2018

(51) Int. Cl.
*G06F 11/20* (2006.01)
(52) U.S. Cl.
CPC ...... *G06F 11/2028* (2013.01); *G06F 11/2025* (2013.01); *G06F 11/2038* (2013.01)
(58) Field of Classification Search
CPC combination set(s) only.
See application file for complete search history.

(56) References Cited

U.S. PATENT DOCUMENTS

| 8,074,109 | B1* | 12/2011 | Roffe | G06F 11/1425 710/267 |
| 2003/0023680 | A1* | 1/2003 | Shirriff | G06F 11/0709 709/204 |
| 2005/0102562 | A1* | 5/2005 | Shinohara | G06F 11/2028 714/15 |
| 2011/0010706 | A1* | 1/2011 | Lambert | G06F 9/45558 718/1 |
| 2011/0191626 | A1* | 8/2011 | Sqalli | G06F 17/30 714/4.12 |
| 2014/0258608 | A1* | 9/2014 | Viswanatha | G06F 12/0873 711/113 |
| 2017/0139797 | A1* | 5/2017 | Wang | G06F 11/3027 |

* cited by examiner

*Primary Examiner* — Amine Riad
(74) *Attorney, Agent, or Firm* — Locke Lord LLP; Tim Tingkang Xia, Esq.

(57) ABSTRACT

Aspects of the disclosure relate to management node failover systems and methods. The system includes two management devices and a detection and reversal device. Each of the two management devices has a processor and a non-volatile memory storing computer executable code. The two management devices function respectively as an active node and a passive node. The detection and reversal device monitors status of the active node. When the active node fails, the detection and reversal device sends an activation signal to the passive node. The passive node, in response to receiving the active signal, switches from the passive node to the active node.

21 Claims, 5 Drawing Sheets

MANAGEMENT NODE FAILOVER FOR HIGH RELIABILITY SYSTEMS

FIELD

The present disclosure relates generally to management controller technology, and more particularly to systems and methods for management node failover for high reliability systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Computing data centers, such as those for cloud computing, are increasingly used in the modern time as a part of a server. Management node plays a vital role in server management and there is an immense need to handle management node failover scenario. However, it is a challenge to provide a cost-effective management node failover mechanism to build a system with high reliability.

Therefore, an unaddressed need exists in the art to address the aforementioned deficiencies and inadequacies.

SUMMARY

Certain aspects of the present disclosure relate to a system. In certain embodiments, the system includes two management devices and a detection and reversal device respectively connected to the two management devices. Each of the two management devices has a processor and a non-volatile memory storing computer executable code. One of the two management devices function as an active node, and the other one of the two management devices function as a passive node. The detection and reversal device is configured to determine status of the active node and when the active node fails, send an activation signal to the passive node. The computer executable code, when executed at the processor of the passive node, is configured to: in response to receiving the active signal, switch the passive node to the active node.

In certain embodiments, the two management devices have identical hardware components and software components.

In certain embodiments, the detection and reversal device is further configured to, during power up of the system, determine one of the two management devices as the active node, and the other one of the two management devices as the passive node.

In certain embodiments, the computer executable code, when executed at the processor of the active node, is configured to monitor and manage a host computing device.

In certain embodiments, the computer executable code, when executed at the processor of the active node, is configured to periodically send a heartbeat signal to the passive node. In certain embodiments, the active node and the passive node use inter-integrated circuit (I²C), general purpose input/output (GPIO), or network to communicate the heartbeat signal.

In certain embodiments, the active node is configured to periodically communicate handshake information with the passive node.

In certain embodiments, the detection and reversal device is configured to monitor status of the active node and the passive node.

In certain embodiments, when the active node fails, the passive node is configured to send a probe signal to the detection and reversal device to confirm the status of the active node.

In certain embodiments, the passive node is configured to send the probe signal after not receiving the heartbeat signal for a predetermined time.

In certain embodiments, when the active node fails, the detection and reversal device is configured to send an interrupt signal to the passive node in response to receiving the probe signal, and the passive node is configured to switch to the active node in response to receiving the interrupt signal.

In certain embodiments, the two management devices are management controllers (BMCs), chassis management nodes, or rack management controllers.

Certain aspects of the present disclosure relate to a method of management node failover for a high reliability system. In certain embodiments, the method includes:

determining status of an active node by a detection and reversal device, where the detection and reversal device is connected to two management devices, one of the two management devices function as the active node, and the other one of the two management devices function as a passive node;

when the active node fails, sending an activation signal to the passive node by the detection and reversal device; and in response to receiving the active signal, switching the passive node to the active node.

In certain embodiments, the two management devices have identical hardware components and software components.

In certain embodiments, the method further includes, during power up of the detection and reversal device and the two management devices: determining, by the detection and reversal device, one of the two management devices as the active node, and the other one of the two management devices as the passive node.

In certain embodiments, the method further comprises: periodically sending a heartbeat signal to the passive node by the active node. In certain embodiments, the active node and the passive node use inter-integrated circuit (I²C), general purpose input/output (GPIO), or network to communicate the heartbeat signal.

In certain embodiments, the method further includes, when the active node fails and the passive node does not receive the heartbeat signal for a predetermined time: sending, by the passive node, a probe signal to the detection and reversal device to confirm the status of the active node; in response to receiving the probe signal, sending an interrupt signal to the passive node by the detection and reversal device; and in response to receiving the interrupt signal, switching the passive node to the active node.

In certain embodiments, the two management devices are management controllers (BMCs), chassis management nodes, or rack management controllers.

Certain aspects of the present disclosure relate to a non-transitory computer readable medium storing computer executable code. In certain embodiments, the computer executable code, when executed at a processor of a first management device, is configured to:

determine status of the first management device in a system as an active node or a passive node, wherein the system comprises the first management device, a second management device, and a detection and reversal device connected to the first and second management devices, and only one of the first and second management devices is determined as the active node at any given time; and when the first management device is determined as the passive node, the second management device is determined as the active node, the second management device fails, the detection and reversal device sends an active signal to the first management device, and in response to receiving the active signal from the detection and reversal device, switch the first management device to the active node.

In certain embodiments, the first and second management devices have identical hardware components and software components.

In certain embodiments, the computer executable code, when executed at the processor of the first management device when the first management device functions as the active node, is configured to: periodically send a heartbeat signal to the second management device that functions as the passive node. In certain embodiments, the active node and the passive node use inter-integrated circuit ($I^2C$), general purpose input/output (GPIO), or network to communicate the heartbeat signal.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1:
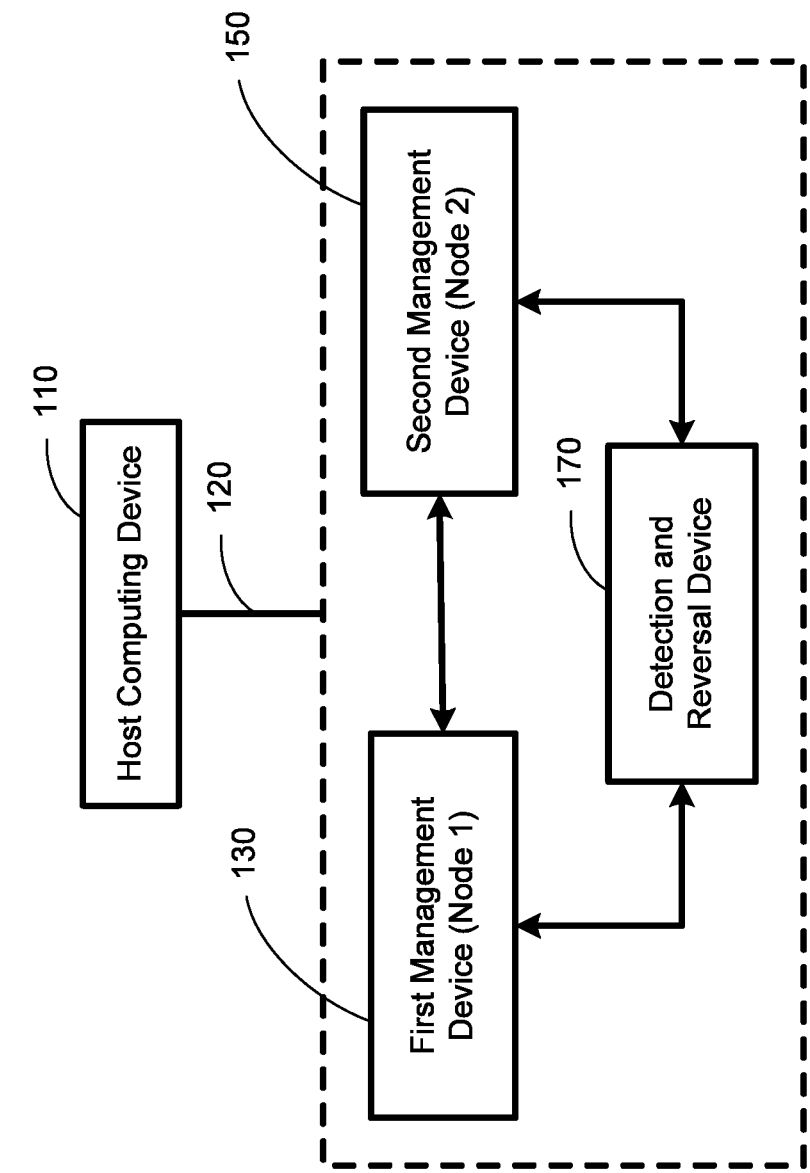
FIG. 1 schematically depicts an exemplary system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refers to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

As discussed above, management node is critical for server management. In certain embodiments of the present disclosure, a high reliability system includes two management nodes. One management node (MN-1) acts in active mode while another management node (MN-2) acts in passive mode. The active and passive mode for each management node is decided during system start up by hardware based role detection and role reversal logic (RD/RR). Further, RD/RR hardware logic is capable of determining the role responsibilities of both MNs at all times. The determination can be achieved using the hardware connectivity interface between MN and the RD/RR hardware.

Both the management nodes are capable to perform the same function needed for server management. The active management node monitors the server health while the passive management node remains in passive management mode but receives heartbeat from the active management node at regular interval as long as the active MN is in good health. Heartbeat signals can be sent using any hardware interface like inter-integrated circuit ($I^2C$), general-purpose input/output (GPIO), network etc. In one example, the active management node executes the full image of the firmware, while the passive management node executes part of the image of the firmware and runs in the background. At any given time, only one of the management nodes functions as the active management node or active node.

In accordance with the purposes of the present disclosure, as embodied and broadly described herein, in certain aspects, the present disclosure relates to a system having a computing device and a management mechanism in communication with the computing device. FIG. 1 schematically depicts an exemplary system according to certain embodiments of the present disclosure. As shown in FIG. 1, a system 100 includes a host computing device 110, a first management device 130, a second management device 150, and a detection and reversal device 170 (also known as a role detection and role reversal device (RD/RR) 170).

The host computing device 110 may function as a server of the management devices 130 and 150. In certain embodiments, the host computing device 110 may be a server, a general purpose computer, or a specialized computer. In certain embodiments, the host computing device 110 may include, without being limited to, a processor, a memory, a storage device, a basic input/output system (BIOS), and other required memory and I/O modules (not shown). Generally, the computing device 110 includes a baseboard or the "motherboard" (not shown). The baseboard is a printed circuit board to which a multitude of components or devices may be connected by way of a system bus or other electrical communication paths. Although not explicitly shown in FIG. 1, the components on the baseboard are interconnected, and the layout of the components on the baseboard and the manner of the interconnection between the components on the baseboard is herein referred to as the configuration of the baseboard. In certain embodiments, the processor and the memory may be components embedded on the baseboard, or may be connected to the baseboard through at least one interface. In certain embodiments, the interface may be physical hardware interface such as electrical connectors, buses, ports, cables, terminals, or other I/O devices. One of ordinary skill in the art would appreciate that the configuration of the baseboard may be adjusted or changed according to the necessary design or manufacturing requirements.

The two management devices 130 and 150 are microcontrollers used to monitor and manage the operation of the host computing device 110. In certain embodiments, the management devices 130 and 150 may be baseboard management controllers (BMCs), chassis management nodes, or rack managers of a server.

In certain embodiments, the first management device 130 may be a component on the baseboard of the host computing device 110. In certain embodiments, the first management device 130 is a separated component from the host computing device 110, and the interface 120 may be present between the host computing device 110 and the two management devices 130 and 150. In certain embodiment, the interface 120 may be a system interface, a universal serial bus (USB) interface or a network, or any other types of interfaces to communicatively connect the management devices 130 and 150 to the host computing device 110.

In certain embodiments, the first management device 130 may be connected to more than one computing devices, and among these computing devices, only the host computing device 110 functions as the server computer of the management devices 130 and 150.

In certain embodiments, the first management device 130 may be implemented by a system on chip (SoC), such as a BMC or a service processor (SP), a chassis management controller, a rack management controller, or by other management controllers. The BMC refers to a specialized microcontroller that manages the interface between system management software and platform hardware. Different types of sensors can be built into the host computing device 110, and the BMC reads these sensors to obtain parameters such as temperature, cooling fan speeds, power status, OS status, etc. The BMC monitors the sensors and can send alerts to a system administrator via a network if any of the parameters do not stay within preset limits, indicating a potential failure of the host computing device 110. The administrator can also remotely communicate with the BMC to take some corrective action such as resetting or power cycling the system to get a hung OS running again.

Figure 2:
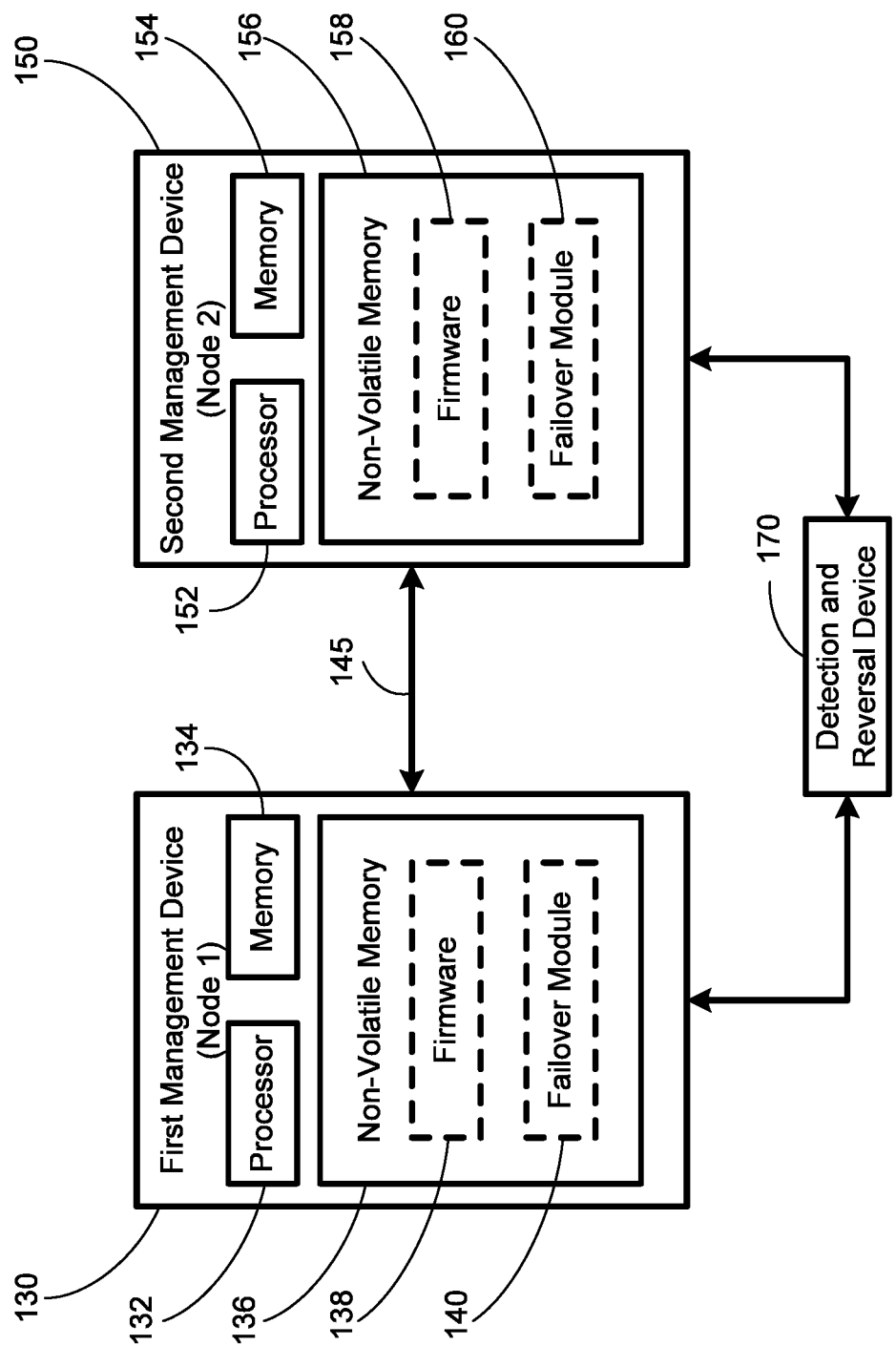
FIG. 2 schematically depicts an exemplary management control system according to certain embodiments of the present disclosure.

In certain embodiments, the first management device 130 may include necessary hardware and software components to perform certain predetermined tasks. For example, as shown in FIG. 2, the first management device 130 includes a processor 132, a memory 134, and a non-volatile memory 136. In certain embodiments, the first management device 130 may include other hardware components and software components (not shown) to perform its corresponding tasks. Examples of these hardware and software components may include, but not limited to, other required memory, interfaces, buses, I/O modules and peripheral devices.

The processor 132 is configured to control operation of the first management device 130. In certain embodiments, the processor 132 may be a central processing unit (CPU). The processor 132 can execute any computer executable code or instructions, such as a firmware 138 or a failover module 140 of the first management device 130 or other applications and instructions of the first management device 130. In certain embodiments, the first management device 130 may run on more than one processor, such as two processors, four processors, eight processors, or any suitable number of processors.

The memory 134 can be a volatile memory, such as the random-access memory (RAM), for storing the data and information during the operation of the first management device 130. In certain embodiments, the memory 134 may be a volatile memory array.

The non-volatile memory 136 is a data storage media for storing the applications of the first management device 130. Examples of the non-volatile memory 136 may include flash memory, memory cards, USB drives, hard drives, floppy disks, optical drives, or any other types of non-volatile data storage devices. In certain embodiments, the first management device 130 may have multiple non-volatile memories 136, which may be identical storage devices or different types of storage devices, and the applications may be stored in one or more of the non-volatile memories 136 of the first management device 130.

As shown in FIG. 2, the non-volatile memory 136 of the first management device 130 stores the firmware 138 to perform monitoring and management of certain components of the host computing device 110, and the failover module 140 configured to provide a failover means for the first management device 130. In certain embodiments, the non-volatile memory 136 may include other applications or modules necessary for the operation of the first management device 130. It should be noted that the firmware 138 and the failover module 140 are each implemented by computer executable codes or instructions. In certain embodiments, the firmware 138 may include multiple modules, and the failover module 140 may further include sub-modules. Alternatively, some of the modules may be combined as one stack.

In certain embodiments, the first management device 130 and the second management device 150 have exactly the same image stored in the management device. In certain embodiments, the two management devices have the same hardware components and software/firmware components.

The failover module 140 of the first management device 130 and a failover module 160 of the second management device 150, when being executed, are configured to provide a failover means for the system 100. Particularly, during power up of the system 100, both the first management device 130 and the second management device 150 initialize. However, only one of the two management devices 130 and 150 function as an active node that is able to monitor and manage certain components of the host computing device 110, and the other one of the two management devices 130 and 150 is a passive node which has limited function and monitors status of the active node. In certain embodiment, the active or passive status of the two management devices 130 and 150 may be determined by the executed failover module 140 and 160 or the hardware of the two management devices 130 and 150. For example, corresponding general purpose input/output (GPIO) pins of the two management devices 130 and 150 may have different values, and the management device 130 or 150 that has a higher GPIO pin value or a lower GPIO pin value may be determined as an active node. In other embodiments, the active or passive status of the two management devices 130 and 150 may be determined by the detection and reversal device 170. For example, the detection and reversal device 170 may be designed to provide certain signal from its one or two GPIO line(s). Each of the two management devices 130 and 150 may check GPIO line(s) of the detection and reversal device 170, such as high/low voltages of the GPIO line(s) of the detection and reversal device 170, to determine whether that management device is an active node or an passive node based on the, for example.

The system 100 only has one active management device or active node at a certain time. In one example, after power up, the firmware 138 and the failover module 140 are executed at the memory 134 by the processor 132, and the first management device 130 is determined as the active node. The firmware 158 and the failover module 160 are executed at the memory 154 by the processor 152, and the second management device 150 is determined as the passive node. The active node 130 is configured to monitor and manage certain components of the host computing device 110, and configured to send a heartbeat signal 145 to the passive node 150 periodically. The passive node 150 is configured to probe the status of the active node 130. In certain embodiments, the passive node 150 receives the periodic heartbeat signal from the active node 130. Once the active node 130 fails, the first management device 130 cannot send heartbeat signal to the passive node 150 anymore, and the passive node 150 does not receive the heartbeat signal anymore from the first management device 130. In certain embodiments, after waiting for a predetermined time without receiving any heartbeat signal, the passive node 150 determined that the first management device 130 has failed. In other embodiments, the passive node 150 may send a probe signal to the detection and reversal device 170 to confirm the failure of the management node 130. Specifically, after waiting for a predetermined time without receiving any heartbeat signal, the passive node 150 send a probe request or probe signal to the detection and reversal device 170 to request status of the first management device 130. The detection and reversal device 170 is configured to determine respectively the status of the management devices 130 and 150. In response to receiving the probe request from the passive node 150, the detection and reversal device 170 confirms the failure of the first management device 130, and sends an activation signal or an interrupt signal or an alert to the passive node 150. In certain embodiments, the interrupt signal or the alert may be a simple GPIO signal. The passive node 150, upon receiving the activation node, switches from passive status to active status, such that the second management device 150 function as the active node and is able to monitor and manage certain components of the host computing device 110. Since the first management device 130 and the second management device 150 substantially have the same hardware and software configuration, the now active node 150 continues the function of the previously active node 130 smoothly, so as to provide a failover means for the server system 100.

Figure 3:
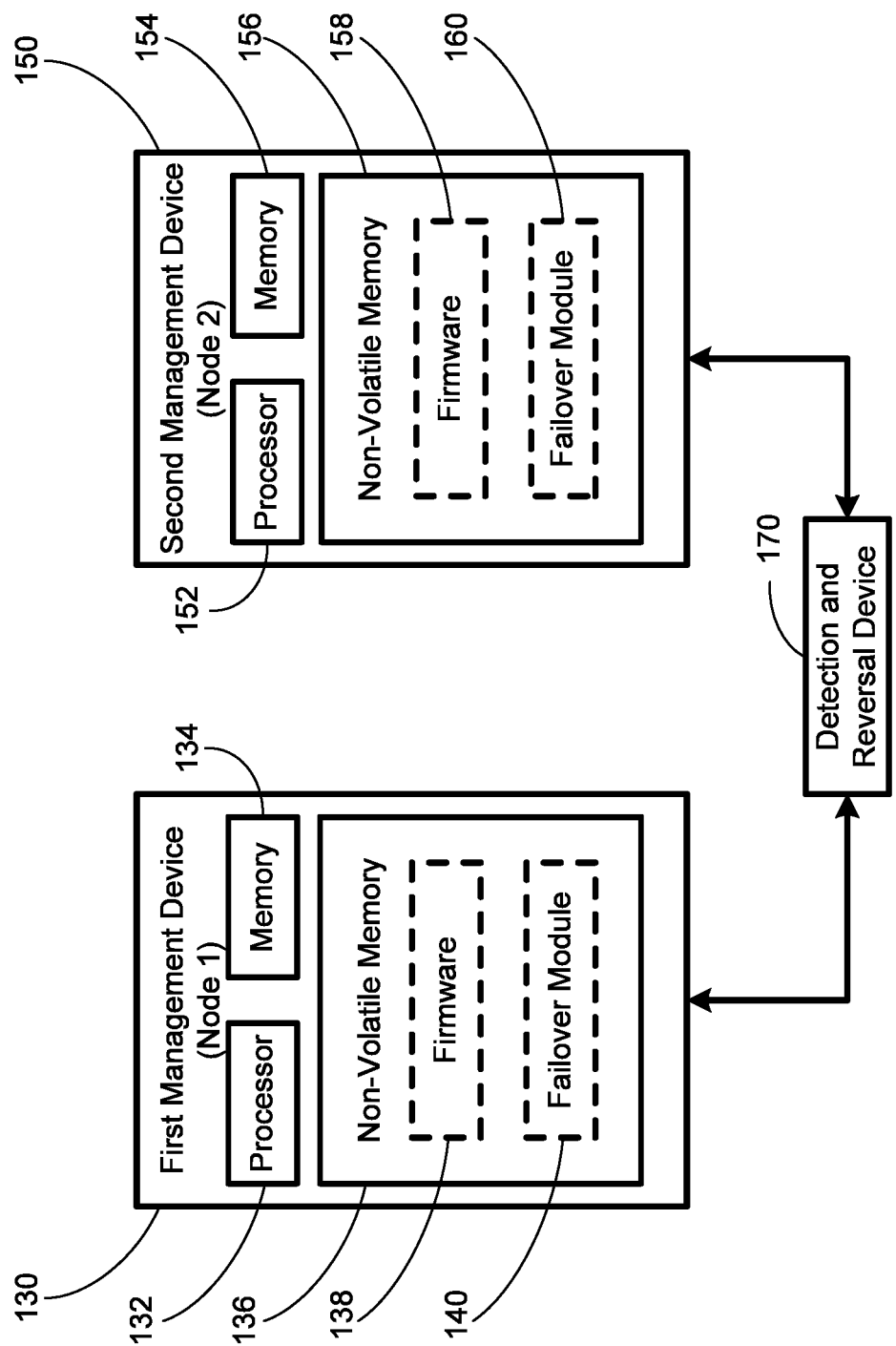
FIG. 3 schematically depicts an exemplary management control system according to certain embodiments of the present disclosure.

In certain embodiments, as shown in FIG. 3, there is no heartbeat communication between the first management device 130 and the second management device 150. The detection and reversal device 170 is configured to determine the status of the first management device 130 and the second management device 150 during power up of the system 100. Optionally, the detection and reversal device 170 continuously determines status of the first management device 130 and the second management device 150 all through the operation of the system 100. Once the statuses are determined, for example the first management device 130 function as the active node and the second management device 150 function as the passive node, the active node 130 operates to monitor and manage certain components of the host computing device 110. During operation, the detection and reversal device 170 constantly or periodically checks status of the active node 130 and the passive node 150. Once the detection and reversal device 170 detects that the active node 130 fails and cannot perform its normal function, the detection and reversal device 170 sends an activation signal or an interrupt signal to the passive node 150, and activates the passive node 150 to an active node. Since the first management device 130 and the second management device 150 substantially have the same hardware and software configuration, the now active node 150 continues the function of the previously active node 130 smoothly, so as to provide a failover means for the server system 100.

In certain aspects, the present disclosure relates to a management node failover process for a high reliability system. In certain embodiments, the process may be implemented by a system as shown in any of FIGS. 1-3.

Figure 4:
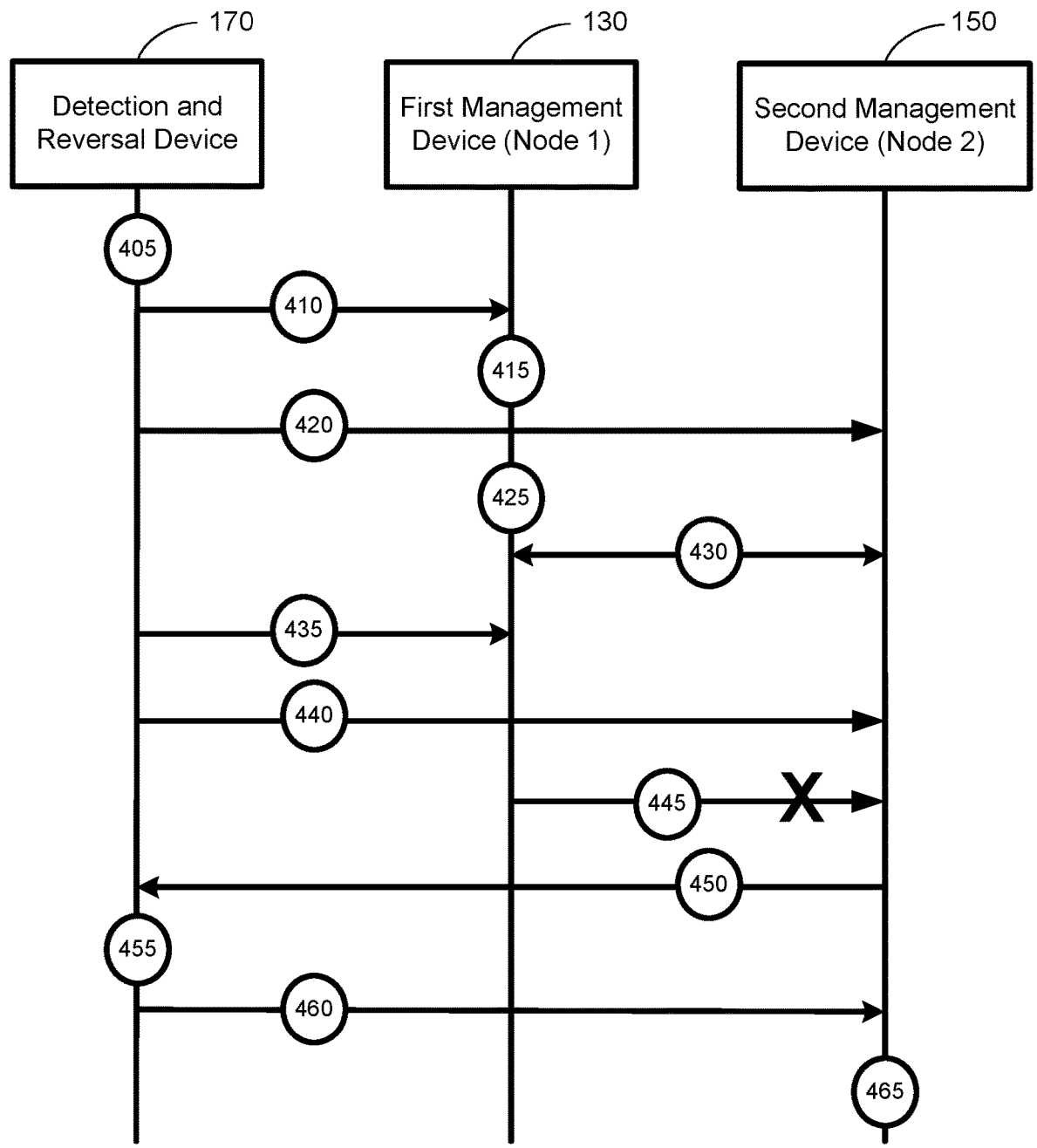
FIG. 4 depicts a process of management node failover for a high reliability system according to certain embodiments of the present disclosure.

FIG. 4 depicts a process of management node failover for a high reliability system according to certain embodiments of the present disclosure. As shown in FIG. 4, at procedure 405, the system is powered up, and the detection and reversal device 170 determines an active node and a passive node respectively from the first management device 130 and the second management device 150. In certain embodiments, the active status and the passive status of the first management device 130 and the second management device 150 may also be determined by the first management device 130 and the second management device 150 themselves instead of the detection and reversal device 170.

At procedure 410, the detection and reversal device 170 may generate and send an active determination signal, i.e., the active status, to the first management device 130. Then at procedure 415, the first management device 130, upon receiving the active determination signal, powers up as the active node. The active node 130 is configured to monitor and manage the host computing device or server device 110.

At procedure 420, the detection and reversal device 170 may generate and send the passive determination signal, i.e., the passive status, to the second management device 150. Then at procedure 425, the second management device 150, upon receiving the passive determination signal, powers up as the passive node. The passive node 150 has limited function, such as probing status of the active node 130, and preparing the passive node 150 to switch to an active node.

Once the active node 130 and the passive node 150 are powered up, at procedure 430, a heartbeat communication is built between the active node 130 and the passive node 150. In certain embodiments, the heartbeat signal is send in a one-way direction from the active node 130 to the passive node 150. In certain embodiments, there is a two-way communication between the active node 130 and the passive node 150. In other embodiments, there is no heartbeat communication between the active node 130 and the passive node 150. In other embodiments, there is data exchange between the active node 130 and the passive node 150 other than the simple heartbeat communication. In certain embodiments, the heartbeat communication may be performed using a hardware interface, such as I²C, GPIO, networks etc. In certain embodiments, the active node 130 and the passive node 150 communicate by handshake instead of heartbeat.

At this stage, at procedures 435 and 440, the detection and reversal device 170 may communicate respectively with the active node 130 and the passive node 150 to check the status of the active node 130 and the passive node 150 constantly or periodically. In certain embodiments, the detection and reversal device 170 may only check the status of the active node 130. The detection and reversal device 170 may actively send detection signal to the active node 130 to detect the status of the active node 130, or the detection and reversal device 170 may passively receive signals from the active node 130 and record the status of the active node 130 based on the received signals.

At procedure 445, once the active node 130 fails to work properly, the active node 130 is not able to send the heartbeat signal to the passive node 150.

At procedure 450, when the passive node 150 doses not receive a heartbeat in a predetermined time interval from the active node 130, the passive node 150 sends a probe signal to the detection and reversal device 170 to confirm the failure of the first management device 130. In certain embodiments, the passive node 150 may wait for a period of time before sending the prove signal to the detection and reversal device 170. For example, the active node 130 may send the heartbeat signal in a 1 second interval to the passive node 150, and the passive node 150 receives a heartbeat signal every one second. When the active node 130 fails and stops sending heartbeat signal to the passive node 150. The passive node 150, after 1 second from a time point, does not receive the expected heartbeat signal. At this time, the passive node 150 doesn't send out the probe signal to the detection and reversal device 170. Instead, the passive node 150 waits for a predetermined time, such as 1 second, two seconds, or 3 seconds. If the passive node 150 still doesn't receive any heartbeat signal during the waiting period, it will then send the probe signal to the detection and reversal device 170.

Upon receiving the probe signal from the passive node 150, at procedure 455, the detection and reversal device 170 confirms that the first management device 130 fails to work. In certain embodiments, the detection and reversal device 170 constantly or periodically detects the status of the first management device 130, and thus can check the status stored in the detection and reversal device 170 after receiving the probe signal. In other embodiments, the detection and reversal device 170 may initiate a detect action to detect the status of the first management device 130 in response to receiving the probe signal from the second management device 150.

At procedure 460, after confirming the failure of the first management device 130, the detection and reversal device 170 generates and sends an activation signal or an interrupt signal to the second management device 150.

At procedure 465, in response to receiving the activation signal, the second management device 150 switches from passive status to active status. At this time, the second management device 150 monitors and manages certain components of the server computing device 110 and function as the active node.

Figure 5:
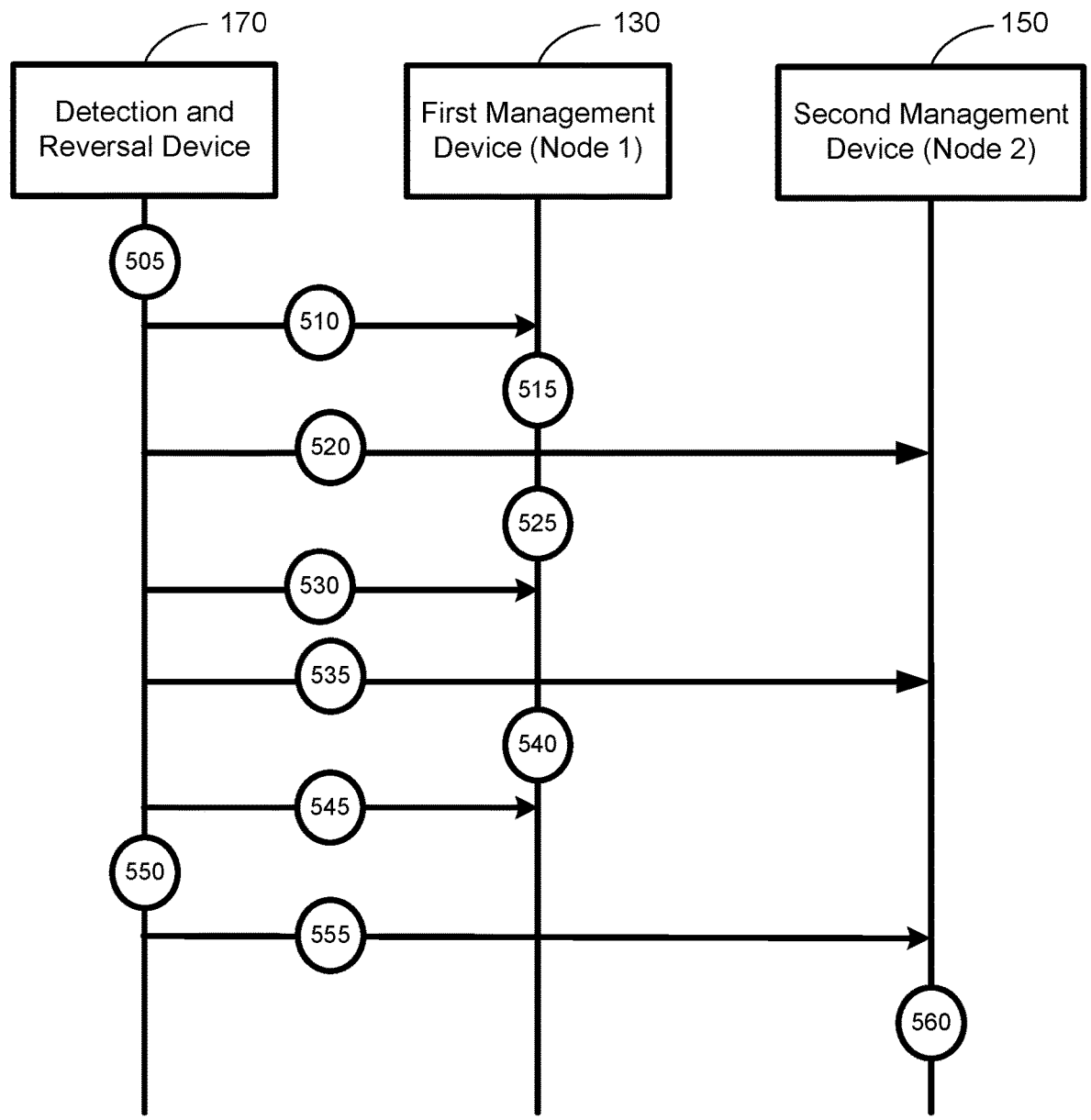
FIG. 5 depicts a process of management node failover for a high reliability system according to certain embodiments of the present disclosure.

FIG. 5 depicts a process of management node failover for a high reliability system according to certain embodiments of the present disclosure. In this embodiment, there is no heartbeat communication between the first management device 130 and the second management device 150. As shown in FIG. 5, at procedure 505, the system is powered up, and the detection and reversal device 170 determines an active node and a passive node respectively from the first management device 130 and the second management device 150. For example, the first management device 130 may be determined as an active node, and the second management device 150 may be determined as a passive node.

At procedure 510, the detection and reversal device 170 may generate and send an active determination signal, i.e., the active status, to the first management device 130. Then at procedure 515, the first management device 130, upon receiving the active determination signal, powers up as the active node. The active node 130 is configured to monitor and manage the host computing device or server device 110.

At procedure 520, the detection and reversal device 170 may generate and send the passive determination signal, i.e., the passive status, to the second management device 150. Then at procedure 525, the second management device 150, upon receiving the passive determination signal, powers up as the passive node. In certain embodiments, the passive node 150 has limited function, such as probe status of the active node 130 through the detection and reversal device 170, and preparing the passive node 150 to switch to an active node.

At this stage, at procedures 530 and 535, the detection and reversal device 170 communicates respectively with the active node 130 and the passive node 150 to check the status of the active node 130 and the passive node 150 constantly or periodically. In certain embodiments, the active node 130 and the passive node 150 may also send their status information constantly or periodically to the detection and reversal device 170, and the detection and reversal device 170 determines status of the active node 130 and the passive node 150 by analyzing the status information received from the active node 130 and the passive node 150.

At procedure 540, the active node 130 fails to work properly.

Under this situation, at procedure 545, the detection and reversal device 170 probes and determines that the first management device 130 fails and cannot fulfill its function as the active node. In other embodiments, the first management device 130 may also send or stop sending certain signal to the detection and reversal device 170 so that the detection and reversal device 170 is informed the failure of the first management device 130.

At procedure 550, the detection and reversal device 170 determines or confirms that the first management device 130 fails to work.

Consequently, at procedure 555, after confirming the failure of the first management device 130, the detection and reversal device 170 generates and sends an activation signal or an interrupt signal to the second management device 150.

At procedure 560, in response to receiving the activation signal, the second management device 150 switches from passive status to active status. At this time, the second management device 150 begins to monitor and manage certain components of the server computing device 110.

In another aspect, the present disclosure relates to a non-transitory computer readable medium storing computer executable code. In certain embodiments, the computer executable code may be stored in the non-volatile memory 136 of the first management device 130 and the non-volatile memory 156 of the second management device 150 as described above. The computer executable code, when being executed, may perform one of a process or method described above. In certain embodiments, the non-transitory computer readable medium may include, but not limited to, the non-volatile memory 136 of the first management device 130 and the non-volatile memory 156 of the second management device 150 as described above, or any other storage media of the management devices 130 and 150.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
   two management devices, each comprising a processor and a non-volatile memory storing computer executable code, wherein one of the two management devices functions as an active node, and the other one of the two management devices functions as a passive node; and
   a detection and reversal device respectively connected to the two management devices, and configured to determine status of the active node and when the active node fails, send an activation signal to the passive node;
   wherein the computer executable code, when executed at the processor of the active node, is configured to: establish a periodic communication directly between the active node and the passive node to indicate that the active node is currently functioning; and
   wherein the computer executable code, when executed at the processor of the passive node, is configured to:

in response to not receiving the periodic communication from the active node for a predetermined time, send a probe signal from the passive node to the detection and reversal device to confirm the status of the active node; and in response to receiving the activation signal, switch the passive node to the active node.

2. The system of claim 1, wherein the two management devices have identical hardware components and software components.

3. The system of claim 1, wherein the detection and reversal device is further configured to, during power up of the system, determine one of the two management devices as the active node, and the other one of the two management devices as the passive node.

4. The system of claim 1, wherein the computer executable code, when executed at the processor of the active node, is configured to monitor and manage a host computing device.

5. The system of claim 1, wherein the computer executable code, when executed at the processor of the active node, is configured to establish the periodic communication between the active node and the passive node by periodically sending a heartbeat signal to the passive node.

6. The system of claim 5, wherein the active node and the passive node use inter-integrated circuit (I²C), general purpose input/output (GPIO), or network to communicate the heartbeat signal.

7. The system of claim 5, wherein the passive node is configured to send the probe signal to the detection and reversal device after not receiving the heartbeat signal from the active node for the predetermined time.

8. The system of claim 1, wherein the active node is configured to establish the periodic communication between the active node and the passive node by periodically communicating handshake information with the passive node.

9. The system of claim 1, wherein the detection and reversal device is configured to monitor status of the active node and the passive node.

10. The system of claim 1, wherein when the active node fails, the detection and reversal device is configured to send an interrupt signal as the activation signal to the passive node in response to receiving the probe signal, and the passive node is configured to switch to the active node in response to receiving the interrupt signal.

11. The system of claim 1, wherein the two management devices are baseboard management controllers (BMCs), chassis management nodes, or rack management controllers.

12. The system of claim 1, wherein the predetermined time is 3 seconds.

13. A method of management node failover for a high reliability system, comprising:
providing a system having two management devices and a detection and reversal device respectively connected to the two management devices, wherein one of the two management devices functions as the active node, and the other one of the two management devices functions as the passive node;

establishing, by the active node, a periodic communication directly between the active node and the passive node to indicate that the active node is currently functioning;

in response to not receiving the periodic communication from the active node for a predetermined time, sending, by the passive node, a probe signal from the passive node to the detection and reversal device to confirm status of the active node;

determining, by the detection and reversal device, the status of the active node;

when the active node fails, sending an activation signal to the passive node by the detection and reversal device; and in response to receiving the activation signal, switching the passive node to the active node.

14. The method of claim 13, wherein the two management devices have identical hardware components and software components.

15. The method of claim 13, further comprising, during power up of the detection and reversal device and the two management devices:
determining, by the detection and reversal device, one of the two management devices as the active node, and the other one of the two management devices as the passive node.

16. The method of claim 13, further comprising:
periodically sending a heartbeat signal to the passive node by the active node as the periodic communication between the active node and the passive node,
wherein the active node and the passive node use inter-integrated circuit (I²C), general purpose input/output (GPIO), or network to communicate the heartbeat signal.

17. The method of claim 16, wherein the passive node is configured to send the probe signal to the detection and reversal device after not receiving the heartbeat signal from the active node for the predetermined time.

18. The method of claim 13, wherein the two management devices are baseboard management controllers (BMCs), chassis management nodes, or rack management controllers.

19. The method of claim 13, wherein when the active node fails, the detection and reversal device is configured to send an interrupt signal as the activation signal to the passive node in response to receiving the probe signal, and the passive node is configured to switch to the active node in response to receiving the interrupt signal.

20. The method of claim 13, wherein the active node is configured to establish the periodic communication with the passive node by periodically communicating handshake information with the passive node.

21. The method of claim 13, wherein the predetermined time is 3 seconds.

* * * * *